United States Patent [19]
Bianchini et al.

[11] 3,803,931
[45] Apr. 16, 1974

[54] VARIABLE-SPEED TRANSMISSION DEVICES

[76] Inventors: Vasco Bianchini, Piazzadel Popolo 31; Pietro Masoni, Via Prov. Francesca Nord 100, both of Pisa, Italy

[22] Filed: Feb. 2, 1972

[21] Appl. No.: 222,904

[30] Foreign Application Priority Data
Feb. 4, 1971 Italy.................................. 9352/71

[52] U.S. Cl. ................................................ 74/117
[51] Int. Cl. ............................................ F16h 29/04
[58] Field of Search............ 74/571 R, 117, 116, 29

[56] References Cited
UNITED STATES PATENTS

| | | | |
|---|---|---|---|
| 2,592,237 | 4/1952 | Bradley | 74/571 R |
| 2,051,783 | 8/1936 | Dake | 74/117 |
| 2,521,067 | 9/1950 | Kennison | 74/117 |
| 2,521,711 | 9/1950 | Galliano | 74/117 |
| 2,834,223 | 5/1958 | Strnad | 74/117 |
| 2,983,154 | 5/1961 | Neukirch | 74/117 |
| 3,459,056 | 8/1969 | Lea | 74/29 |

FOREIGN PATENTS OR APPLICATIONS

| | | | |
|---|---|---|---|
| 412,050 | 6/1934 | Great Britain | 74/117 |

*Primary Examiner*—Leonard H. Gerin
*Assistant Examiner*—Wesley S. Ratliff, Jr.
*Attorney, Agent, or Firm*—Eric H. Waters

[57] ABSTRACT

A variable-speed transmission device comprises an output shaft rotated from a first eccentric member through unidirectional driving couplings. The eccentric member, which is driven by an input shaft, has a variable eccentricity which adjusts the speed ratio between the input and output shafts. A second eccentric member, balances the first eccentric member.

7 Claims, 9 Drawing Figures

VARIABLE-SPEED TRANSMISSION DEVICES

FIELD OF THE INVENTION

The present invention relates to variable-speed transmission devices.

SUMMARY OF THE INVENTION

According to the present invention, there is provided in a variable-speed transmission device, a drive shaft a first eccentric member having a variable eccentricity, said eccentric member being driven by the drive shaft, gear means a driven shaft rotatable with the gear means a first group of driving units each comprising an input member oscillated by the first eccentric member during rotation of the drive shaft, an output drive gear meshing with the gear means, and unidirectional coupling means linking the input member and the output drive gear whereby the input member drives the output drive gear when the input member pivots in one sense and the output drive gear rotates relative to the input member when the input member pivots in the reverse sense, a second eccentric member linked with the first eccentric member and balancing the first eccentric member, the speed ratio between the drive shaft and driven shaft being dependent upon the amplitude of oscillation of the input members of the respective driving units.

BRIEF DESCRIPTION OF THE DRAWINGS

Embodiments of the invention will now be described, by way of example only, with reference to the accompanying diagrammatic drawings, in which.

DESCRIPTION OF THE PREFERRED EMBODIMENTS

Figures 1, 2, 3:
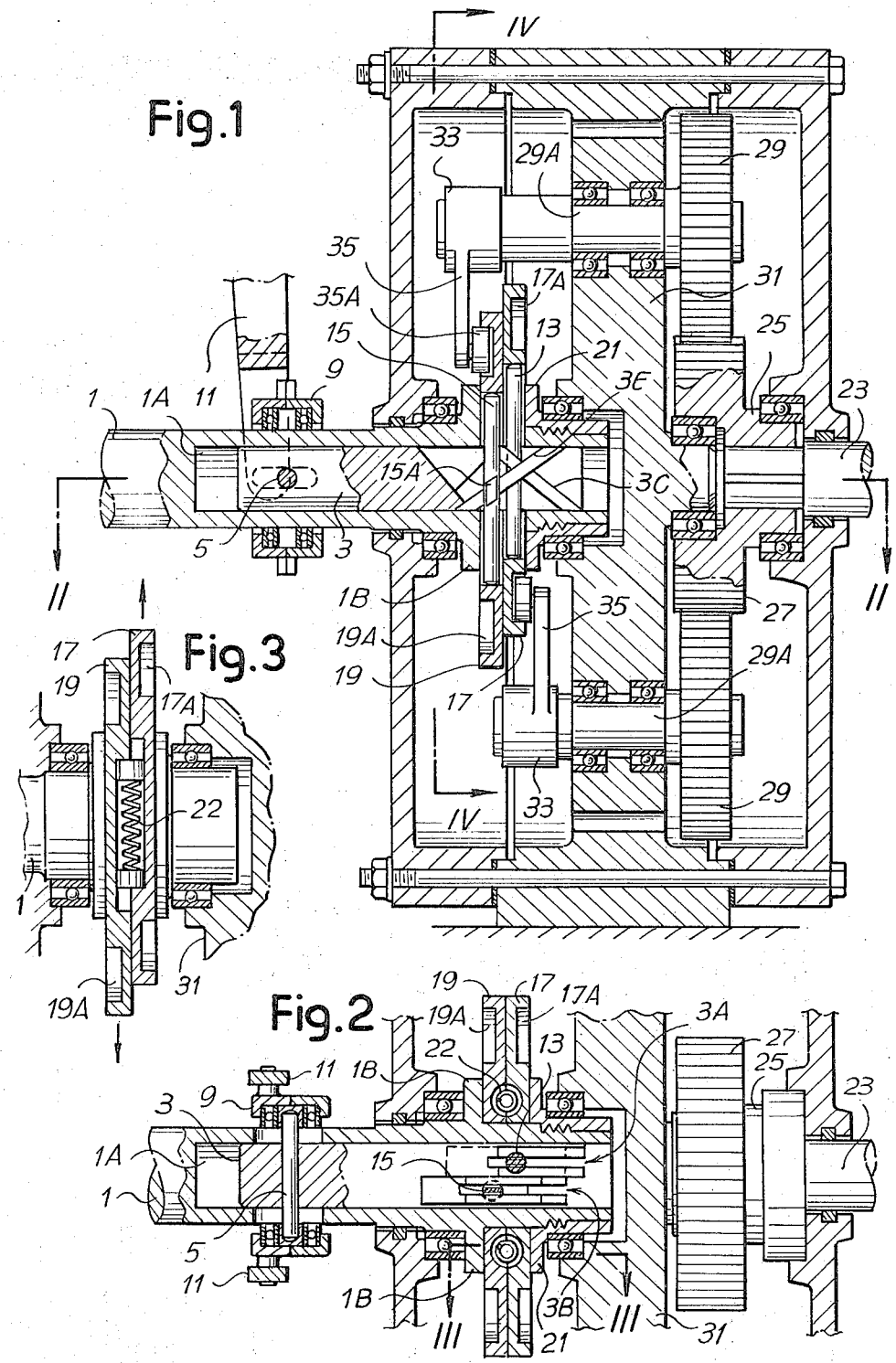
FIG. 1 is a longitudinal section of a variable-speed transmission device in accordance with the present invention.
FIG. 2 is a fragmentary section taken on line II—II of FIG. 1.
FIG. 3 is a local section taken on line III—III of FIG. 2.
Figure 4:
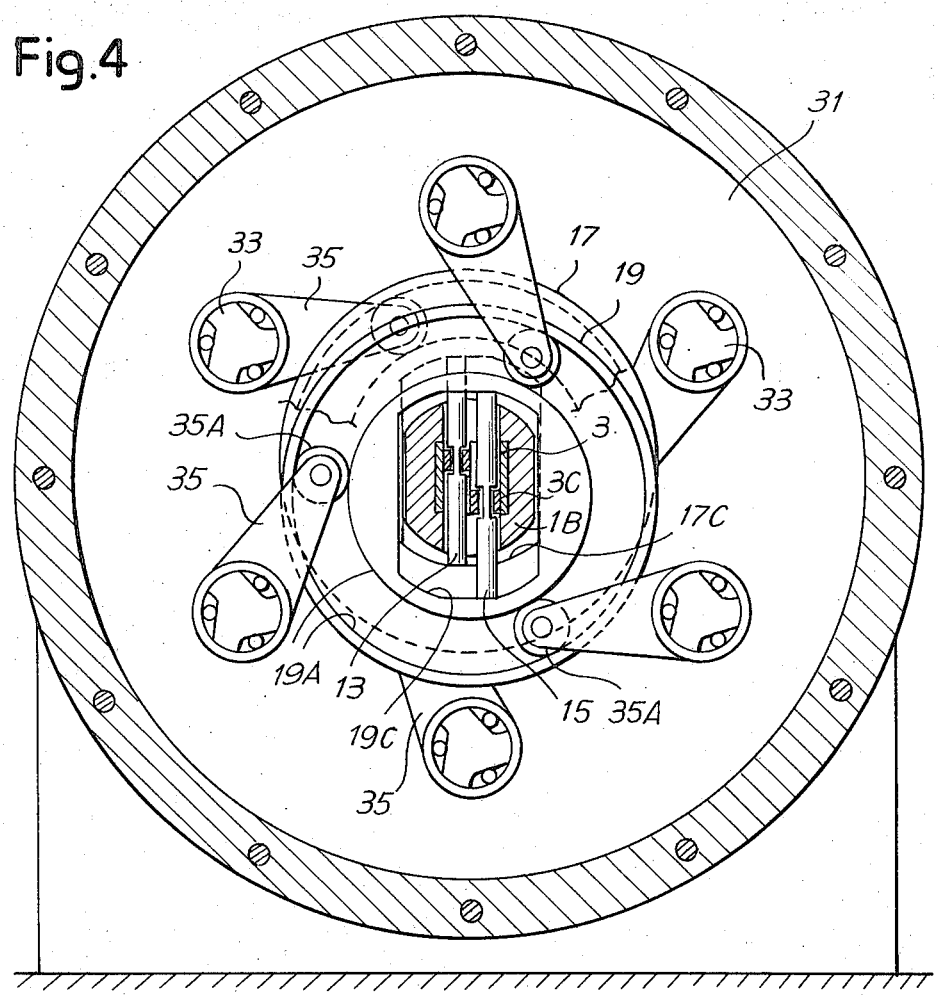
FIG. 4 is a section taken on line IV—IV of FIG. 1.
Figure 5:
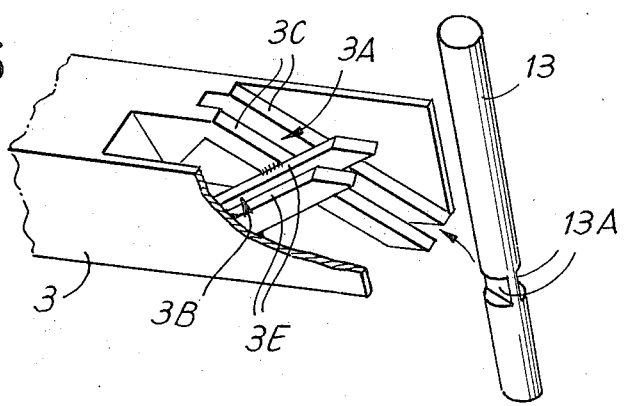
FIG. 5 is a perspective view of a control member for varying the eccentricity of eccentric members of the device.
Figure 6:
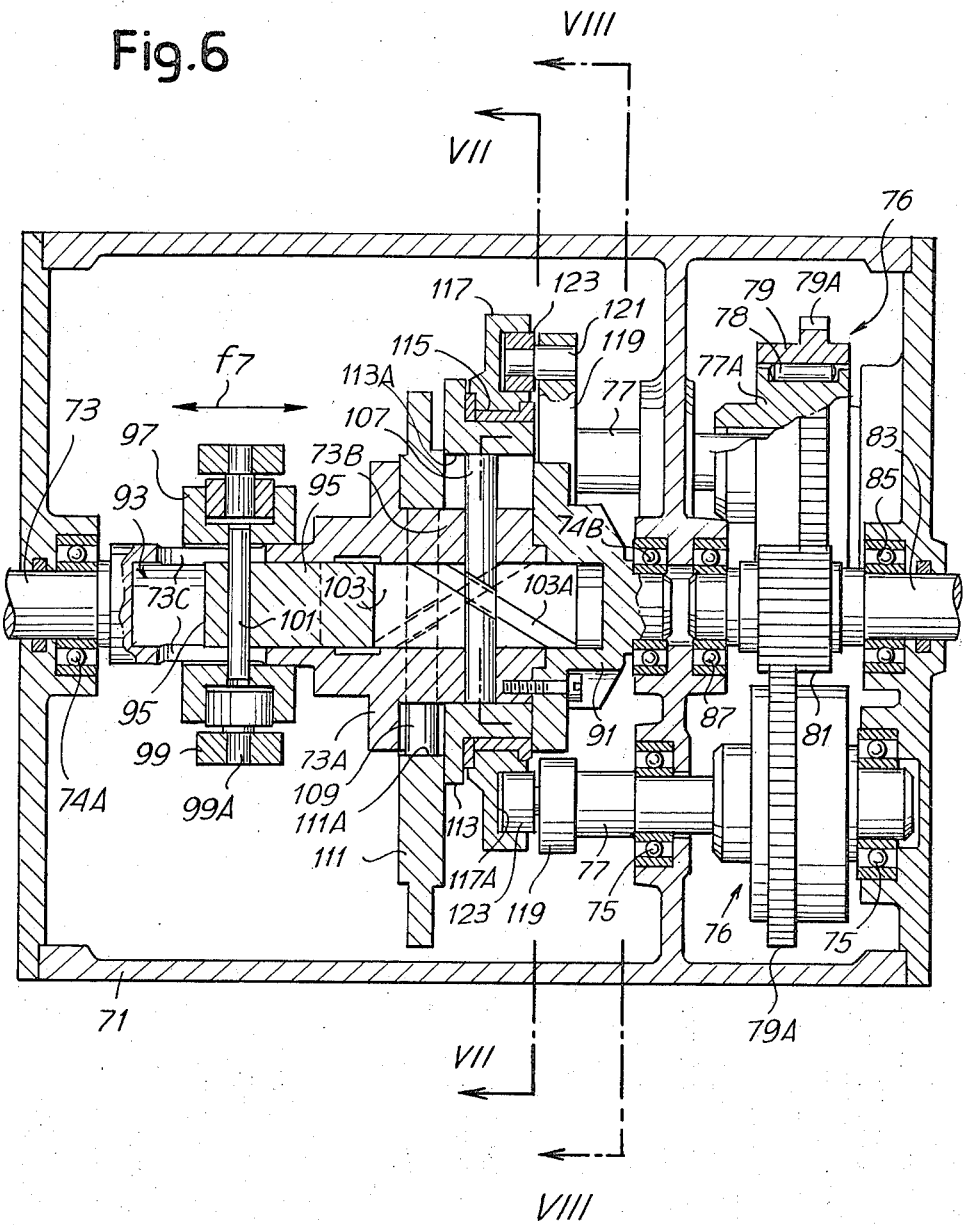
FIG. 6 is a longitudinal section of a modified embodiment of the transmission device.
Figure 7:
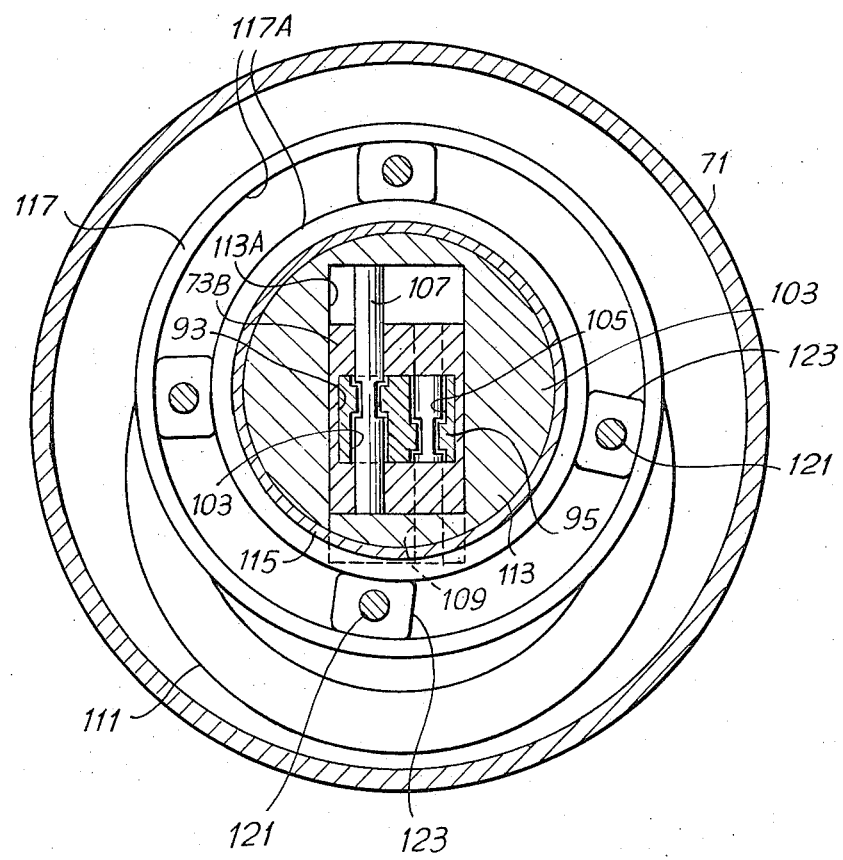
FIGS. 7 and 8 are sections taken on line VII—VII and VIII—VIII in FIG. 6.
Figure 8:
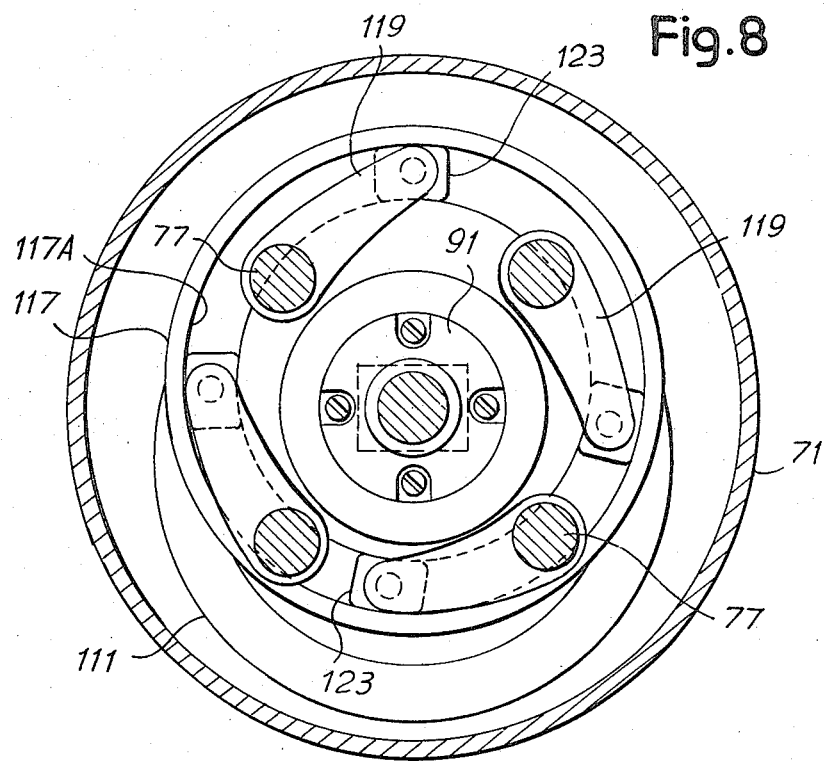

In the variable-speed transmission device shown in FIGS. 1 to 5, a drive shaft 1 has a guide cavity 1A for a control member in the form of a slide 3 capable of being axially moved by means of a pin 5 from a collar 9 operated by a fork 11; the pin 5 is engaged by the collar 9 via rolling bearings and extends through slots in the wall of the shaft 1. The slide 3 is shaped as shown particularly in FIG. 5 with two longitudinal profiles 3A and 3B defining ramps 3C and 3E inclined in opposite directions. On each of the ramps 3C and 3E there is slidably engaged a stem 13 and 15 respectively; the two stems are provided for this purpose with grooves 13A and 15A respectively. The ends of the two stems 13 and 15 engage in apertures 17C and 19C in the eccentrics 17 and 19 respectively. The two eccentrics 17, 19 are interposed between a flange 1B on the shaft 1 and a flange 21 mounted at the end portion of the shaft 1. Adjustment of the eccentricity of the eccentrics 17, 19 is effected by axial movement of the slide 3, the eccentricity of the eccentrics 17, 19 being equal in diametrically opposite directions. A spring 22 acts between the eccentrics 17, 19 and biases the eccentrics in a sense to decrease their eccentricity.

A driven shaft 23 coaxial with the drive shaft 1, carries a member 25 which forms an externally toothed pinion 27. Planet gears 29 meshing with the pinion 27 are carried by shafts 29A mounted in a stationary planet-gear carrier 31. By means of a unidirectional clutch 33 on each of the shafts 29A there is mounted a pawl 35 in the form of an arm. The pawls 35 are each arranged in one of two transverse planes to cooperate with the respective one of the eccentrics 17 and 19. For this purpose each pawl 35 carries at its free end portion a follower roller 35a engaged in an annular race 17A or 19A formed on the eccentric 17 or 19 respectively. Each gear 29, shaft 29A and clutch 33 forms a respective unidirectional driving unit.

In each revolution of the eccentrics 17, 19, the pawls 35 are oscillated and drive via the clutches 33, the shafts 29A and the gears 29. In this manner the gears 29 are driven unidirectionally.

It is possible to obtain with the described arrangement rotation of the pinion 27 and driven shaft 23 at a speed ratio with respect to the drive shaft 1, which is gradually variable and is a function of the eccentricity of the eccentrics 17, 19. The speed ratio can be varied from zero to a predetermined maximum. The variation of the speed ratio is obtained by converting rotational motion into reciprocable or oscillatory motion of which the amplitude is varied, and thence again into rotational motion.

Although the drive applied to each gear 29 from the eccentrics is stepwise, since there are several gears 29 and two out-of-phase eccentrics, the subsequent motion of the pinion 27 and the driven shaft 23 is substantially uniform. The second eccentric 19 also serves to balance the eccentric 17.

The centrifugal force on the eccentrics can be utilised to provide the control force required to increase the eccentricity thereof, the control force being dependent upon the reactions of the load on the eccentric. There may be provided, according to circumstances, an unbalance forming a centrifugal effect in the centered array of the eccentrics or viceversa, according to the uses or loads in question.

In order to adjust the torque and distribute the load, anti-tearing means or resilient couplings can be provided between the clutches 33 and the gears 29, to dampen and return the stresses or efforts. It is appropriate for this purpose to increase of the number of the peripheral units.

It will be noted that the variation of the eccentricity is indifferently operable both during the dwell and in motion, compatibly with the stresses due to the reactions of the load.

The variable-speed transmission device can be utilised, for example in the transmission of a vehicle, or in machine tools.

In the embodiment shown in FIGS. 6 to 9, the device comprises a casing 71 into which extends a drive shaft 73. The drive shaft 73 is journalled in bearings 74A, 74B. Mounted in the casing 71, by means of bearings 75, are a plurality of unidirectional driving units having a unidirectional clutch or coupling 76 known per se. Each driving unit has an input shaft 77 capable of oscillatory motion, a cylindrical body 77A being integral with the shaft 77 and having an annular groove in its rim. Rollers 78 received in the annular groove of the body 77A support, in wedged relation, a ring gear 79 having external gear teeth 79A, the gear 79 and the body 77A being rotatable unidirectionally. The gear 79 can rotate in the allowed direction independently of the associated input shaft 77, but is driven by the shaft 77 when the shaft 77 rotates in the same direction as the gear 79. The teeth 79A of the gears 79 mesh with a pinion 81 carried by a driven shaft 83, coaxial with the shaft 73 and journalled on bearings 85, 87. In order to allow the gears 79 to mesh freely with the pinion 81, the respective gears 79 are arranged in different transverse planes whereby the respective gears 79 engage the pinion 81 at different axial positions along the pinion 81 which is elongate for this purpose.

The drive shaft 73 is externally stepped in order to form a flange 73A, followed by a prismatic portion 73B. The end portion of the shaft is connected to a terminal member 91, the axial end portion of which is accommodated in the bearing 74B. The shaft 73 and the member 91 connected thereto have an axial cavity forming a prismatic seat 93. More particularly, the cavity extends through the portion 73B of the shaft 73 which is formed between the flange 73A and the member 91. A control member in the form of a slide 95 slidable in the seat 93 has a section corresponding to that of the seat 93. The slide 95 can be moved axially (as indicated by double arrow f7) by means of a collar 97, which surrounds the shaft 73, and a fork 99; the fork 99 is linked by means of pins 99A to the collar 97, and the latter, by means of a pin 101 is engaged with the slide 95, the pin 101 passing through longitudinal slots 73C in the wall of the shaft 73.

Figure 9:
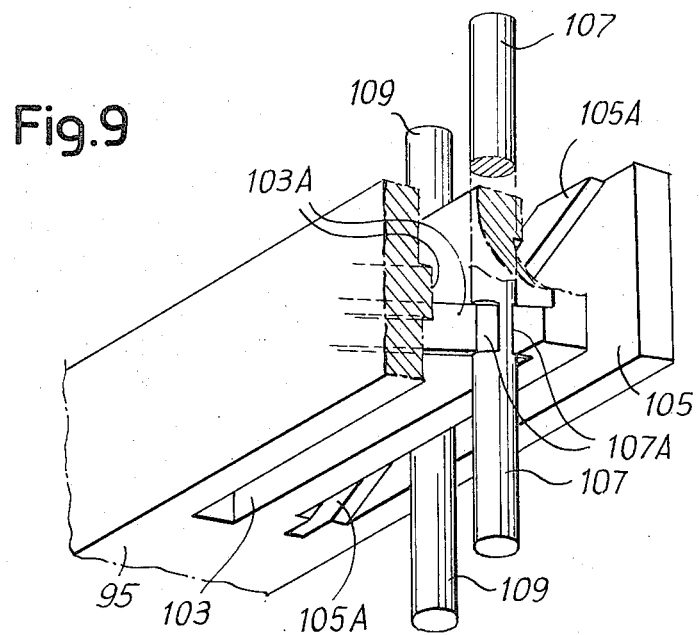
FIG. 9 is a perspective view of a control member for varying the eccentricity of eccentric members of the device.

As is clearly shown in FIG. 9, the end portion of the slide 95 nearer the member 91 has two axial slots 103, 105. Opposed axial guides 103A, 105A are formed on the side walls of the slots 103, 105, the guides 103A and 105A, being inclined in opposite directions with respect to the axis of the slide. A stem 107 is engaged with the inclined guides 103A by notches 107A, and similarly a stem 109 is engaged with the guides 105A, the stems extending transversely to the axis of the shaft 73. The stems 107, 109 project through the portion 73B of the shaft 73 and when the slide 95 is moved axially with respect to the shaft 73, owing to the opposite inclination of the guides 103A and 105A, the stems 107 and 109 are moved along their own axis in opposite directions.

Two eccentric members 111 and 113 are mounted on the portion 73B of the drive shaft 73 and at least the member 113 forms an adjustable eccentric; the member 111 forms a counter-weight provided for equalization or balance purposes and is movable transversely with respect to the rotational axis of the shaft 73, through the stem 109, which is interposed between two opposite sides of an elongage rectangular aperture 111A provided in the member 111. The aperture 111A is formed to allow movement guide of the member 111 radially with respect to the shaft 73, (corresponding to the orientation of the axis of the stem 109) whilst preventing rotation of the member 111 with respect to the shaft 73. The member 113 also has a rectangular aperture 113A, the stem 107 being interposed between two opposite sides of the aperture 113A. The stems 107 and 109 cause the eccentric 113 and the member 111 to be moved in opposite directions when the slide 95 is moved axially. The two members 111 and 113 are restrained but can slide with respect to the opposite sides of the flange 73A and of the member 91.

The member 113, which has a circular periphery, accommodates a peripheral bearing which, as illustrated, is a bushing 115, but can alternatively be another form of bearing also of the rolling type, for example a roller or needle bearing. The bearing on the member 113 (which rotates together with the shaft 73) mounts a ring 117 which has an annular race 117A on the face of the ring facing the driving units 76. The annular race 117A has a circular profile, the eccentricity of which in relation to the axis of the shaft 73 varies with the position of the slide 95; it is to be noted that the ring 117 does not necessarily need to rotate, the bearing 115 thus permitting the member 113 which rotates with the shaft 73, to rotate relative to the ring 117.

The shaft 77 of each driving unit 76 carries at its respective outer end, a pawl in the form of an arm 119 integral with the shaft 77. A follower in the form of a slide member 123 is linked by means of a pin 121 to each arm 119 and is received in the annular race 117A of the ring 117. Although all the slide members 123 can be slidable in the race 117A, one of the slide members 123 can be fixedly mounted to the ring 117 in such a manner as to prevent the ring 117 from rotating with the drive shaft 73. When the race 117A is concentric with the axis of the shaft 73, no motion is imposed to the arms 119; when the annular race 117A is eccentric to the axis of the shaft 73, the rotation of the shaft 73 will periodically cause oscillation of each of the arms 119 and the shafts 77, the phase difference between oscillation movement of the shafts 77 being dependent upon the positioning of the driving units around the common axis of the shafts 73 and 83. Each of the shafts 77 acts on the unidirectional coupling of its associated driving unit to transmit drive through the gear 79 to the pinion 81 and thus to the shaft 83, whenever each shaft 77 has a speed higher than the other shafts in the active direction of the oscillation, while in the remaining portion of the cycle of oscillation of the respective shafts 77 no driving face is transmitted to the respective gear 79, from the driving unit 76. By varying the eccentricity of the ring 117, and thus of the race 117A, a variation of the angular speed of the shafts 77 is obtained in the periods during which each shaft is oscillated; in this manner the speed of the output shaft 83 is varied.

When the speed of the drive shaft 73 is relatively high there is provided an automatic equalization — although approximate — of the centrifugal effects due to the eccentricity of the mass of the ring 117 and consequently of the slide members 123 and the arms 119, such equalisation being provided by the member 111. The member 111 also serves to facilitate the adjustment of the eccentricity (that is by axial movement of the slide 95) particularly during adjustment from a condition of zero eccentricity (i.e., when the shaft 83 is stationary) to a condition of relatively high eccentricity. When it is desired to accentuate the centrifugal effect in a sense to facilitate increase of the eccentricity, the members 111 and 113 can be provided with additional eccentric masses.

It will be noted that decrease of the eccentricity and thus of the speed of the output shaft 83, can — under certain conditions — be assisted by or even obtained by the effect of a resistant torque acting on the shaft 83 and tending to brake the shaft 83.

Even when the shaft 73 is rotating at high speeds, there is no difficulty due to friction or to insufficient lubrication in the drive from the ring 117 to the shafts 77 since the bearing 115 interposed between the member 113 and the ring 117 avoids the necessity of correspondingly high angular speeds of the ring 117 and of a high relative velocity between the slide members 123 and the race 117A. Additionally by using the bearing 115, however arranged, complex lubrication problems are avoided, and relative motion between the race 117A and each of the slide members 123 is reduced to a negligible extent even when the eccentricity is relatively high.

We claim:

1. In a variable-speed transmission device,
   a drive shaft
   a first eccentric member having a variable eccentricity, said eccentric member being driven by the drive shaft,
   gear means,
   a driven shaft rotatable with the gear means
   a first group of driving units each comprising
      an input member oscillated by the first eccentric member during rotation of the drive shaft,
      an output drive gear meshing with the gear means,
      unidirectional coupling means linking the input member and the output drive gear whereby the input member drives the output drive gear when the input member pivots in one sense and the output drive gear rotates relative to the input member when the input member pivots in the reverse sense,
   at least a second eccentric member linked with the first eccentric member and balancing the first eccentric member in any eccentricity condition, the speed ratio between the drive shaft and driven shaft being dependent upon the amplitude of oscillation of the input members of the respective driving units, and
   spring means biasing the first and second eccentric members in a sense to reduce their eccentricity.

2. A device as claimed in claim 1 further comprising
   a ring member,
   bearing means, said ring member being mounted on the first eccentric member by said bearing means whereby the first eccentric member rotates relative to the ring member and reciprocates radially the ring member, and
   means linking the input member of each driving unit to the ring member whereby the input members are oscillated by reciprocation of the ring member.

3. A device as claimed in claim 2 wherein the ring member defines an annular race and wherein the linking means comprises
   follower means received in the race, and
   an arm mounting the follower means and carried by the input member.

4. A device as claimed in claim 3 wherein one of the follower means is fixedly mounted to the ring.

5. A device as claimed in claim 1 wherein the eccentricity of the second eccentric member is equal and opposite to the eccentricity of the first eccentric member.

6. A device as claimed in claim 5 comprising
   a second group of said driving units, the input members of each driving unit of the second group being oscillated by the second eccentric member during rotation of the drive shaft.

7. A device as claimed in claim 1 further comprising eccentric masses, said eccentric masses being mounted on the first and second eccentric members.

* * * * *